(12) United States Patent
Ogasawara (10) Patent No.: US 10,977,780 B2
(45) Date of Patent: Apr. 13, 2021

(54) IMAGE PROCESSING DEVICE, CONTROL METHOD THEREOF, AND IMAGING DEVICE

(71) Applicant: CANON KABUSHIKI KAISHA, Tokyo (JP)

(72) Inventor: Tsutomu Ogasawara, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 16/138,088

(22) Filed: Sep. 21, 2018

(65) Prior Publication Data

US 2019/0096047 A1 Mar. 28, 2019

(30) Foreign Application Priority Data

Sep. 28, 2017 (JP) ............... JP2017-188179

(51) Int. Cl.
| | |
|---|---|
| G06T 5/20 | (2006.01) |
| G06T 5/00 | (2006.01) |
| H04N 5/232 | (2006.01) |
| G06T 5/50 | (2006.01) |
| G06T 3/40 | (2006.01) |
| H04N 5/225 | (2006.01) |
| G06T 7/13 | (2017.01) |
| G06T 7/33 | (2017.01) |

(52) U.S. Cl.
CPC ................ *G06T 5/20* (2013.01); *G06T 3/40* (2013.01); *G06T 3/4007* (2013.01); *G06T 5/002* (2013.01); *G06T 5/50* (2013.01); *G06T 7/13* (2017.01); *G06T 7/337* (2017.01); *H04N 5/2258* (2013.01); *H04N 5/23229* (2013.01); *G06T 2207/10148* (2013.01)

(58) Field of Classification Search
CPC .. G06T 5/20; G06T 7/13; G06T 7/337; G06T 3/40; G06T 3/4007; G06T 5/002; G06T 5/50; G06T 2207/10148; H04N 5/2258; H04N 5/23229
See application file for complete search history.

(56) References Cited

U.S. PATENT DOCUMENTS

| | | | |
|---|---|---|---|
| 9,710,897 B2 | 7/2017 | Nishiyama et al. | |
| 2012/0268641 A1* | 10/2012 | Kazama | H04N 5/23212 348/333.11 |
| 2013/0223759 A1* | 8/2013 | Nishiyama | G06K 9/36 382/284 |

FOREIGN PATENT DOCUMENTS

| | | |
|---|---|---|
| JP | 2002-094765 A | 3/2002 |
| JP | 2016-167234 A | 9/2016 |

* cited by examiner

*Primary Examiner* — Twyler L Haskins
*Assistant Examiner* — Fayez A Bhuiyan
(74) *Attorney, Agent, or Firm* — Cowan, Liebowitz & Latman, P.C.

(57) ABSTRACT

An image processing device acquires the image data from each imaging device and acquires information on a focal length and the number of pixels of each imaging device. The image processing device ascertain a size relationship of a subject shown in a plurality of pieces of image data on the basis of the acquired information, performs resizing so that subject images have the same size, and executes an alignment process.

11 Claims, 7 Drawing Sheets

IMAGE PROCESSING DEVICE, CONTROL METHOD THEREOF, AND IMAGING DEVICE

BACKGROUND OF THE INVENTION

Field of the Invention

The present invention relates to a process of resizing and aligning a plurality of images.

Description of the Related Art

Examples of an imaging device includes a compound eye camera, and a camera having pupil division type imaging elements. Meanwhile, communication between cameras and smartphones is also becoming widespread due to advanced communication environments. It is possible to improve ease of use and image quality by acquiring a plurality of images, simply arranging these images, and displaying an image, as well as associating a plurality of images. As a device that performs a process of combining a plurality of images with different imaging conditions, a device that reduces noise by combining a plurality of images and suppresses degradation of resolution by reducing a weight for an image captured at a wide angle has been disclosed (Japanese Patent Laid-Open No. 2016-167234). Further, a device that scales and combines a plurality of images captured at different focal lengths in the same camera such that subject images have the same size has been disclosed (Japanese Patent Laid-Open No. 2002-94765).

Incidentally, when a plurality of images are combined, the images need to be aligned with each other, and speed or precision in the alignment may be required according to applications. If a plurality of imaging systems are included in one device as in a compound eye camera, a positional relationship between the images is known in advance. However, in a configuration in which a lens device can be detachably mounted on a camera body unit, it is necessary to ascertain the positional relationship each time the lens device is connected.

Further, in continuous capturing of still images, moving image capturing, and live view capturing, images are continuously acquired in a short period. Accordingly, if it takes time to perform an alignment process, it is necessary to increase an imaging period (a frame rate, or a time interval corresponding to a rate). In particular, if image sizes of a subject shown in two images that are alignment targets are different, it is necessary to match the image sizes of the subject before alignment. If a difference between the image sizes of the subject cannot be ascertained, it is necessary to set a plurality of image sizes as image sizes of images that are alignment targets and perform alignment. Accordingly, more processing time is taken. Further, if a plurality of similar subjects are present in a composition at the time of imaging, a likelihood of an erroneous determination is high when a difference in size between subjects cannot be ascertained in advance. That is, subjects with different sizes are likely to be determined to be the same subject. Furthermore, when the alignment process is executed each time when a plurality of continuously captured images are acquired, the power consumption of the device increases.

SUMMARY OF THE INVENTION

The present invention performs a process of resizing and aligning a plurality of pieces of image data more accurately and in a short time.

A device according to an embodiment of the present invention is an image processing device comprising: at least one processor; and at least one memory device storing a program which, when executed by the processor, causes the processor to function as; an acquiring unit configured to acquire information of a focal length of a first imaging optical system corresponding to a first image data, a focal length of a second imaging optical system corresponding to a second image data, a number of pixels of the first image data, and a number of pixels of the second image data, together with the first image data and the second image data; and a processing unit performs resizing of at least one of the first image data and the second image data using a ratio calculated from the acquired information and perform alignment between the first image data and the second image data, wherein the acquiring unit and the processing unit are implemented by the at least one processor executing at least one program recorded on the at least one non-transitory memory device.

According to the present invention, it is possible to perform a process of resizing and aligning a plurality of pieces of image data more accurately and in a short time.

Further features of the present invention will become apparent from the following description of exemplary embodiments (with reference to the attached drawings).

DESCRIPTION OF THE EMBODIMENTS

Hereinafter, respective embodiments of the present invention will be described in detail with reference to the accompanying drawings. In the following embodiments, an example in which high-speed alignment is performed when images captured by a plurality of communicating imaging devices are sequentially superimposed and displayed, a first imaging device is used for recording, and a second imaging device is used for subject detection will be described.

First Embodiment

Figure 1:
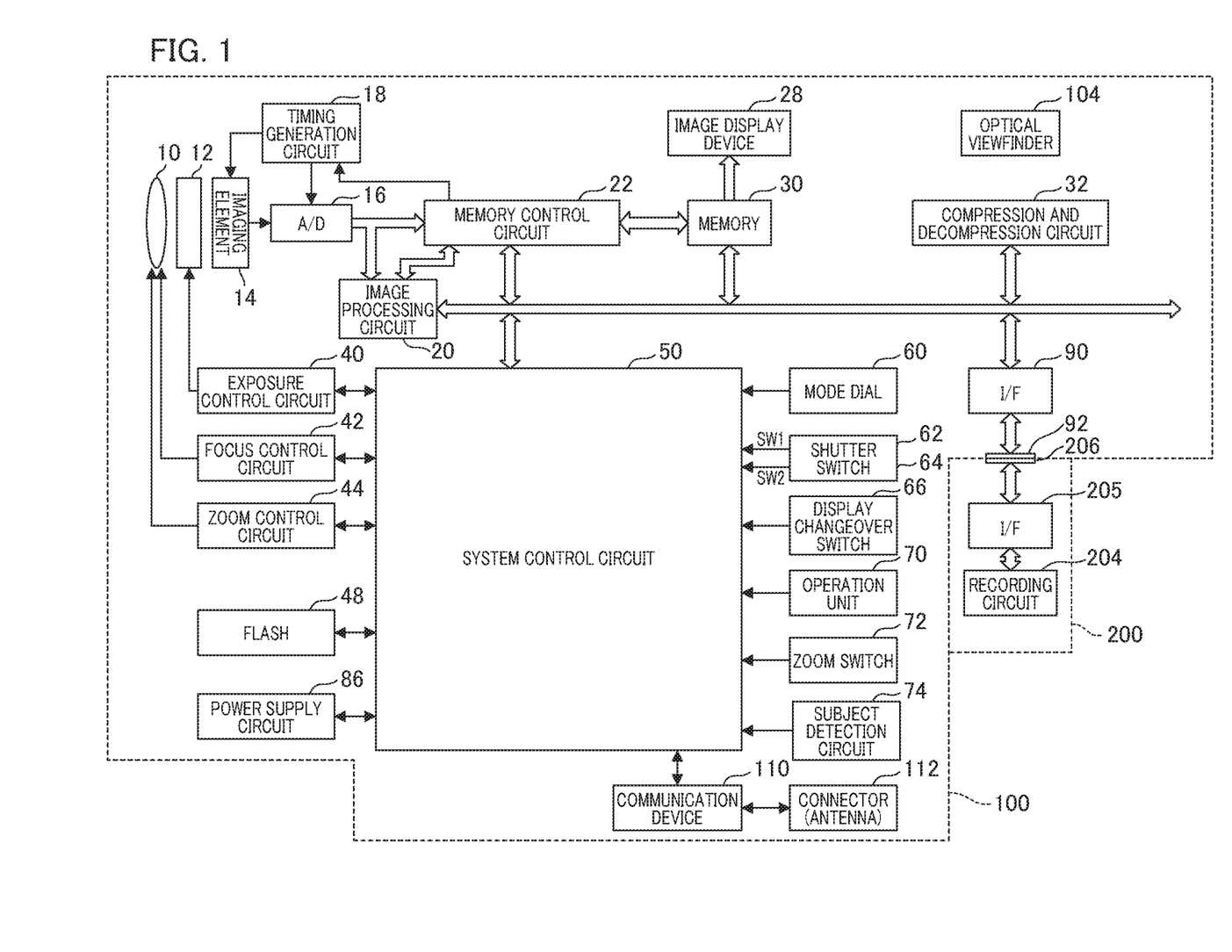
FIG. 1 is a configuration diagram illustrating an imaging device according to a first embodiment.

FIG. 1 is a configuration diagram of an imaging device according to this embodiment. A configuration example of a digital camera for which an image processing device 100 is applied is illustrated. An imaging lens 10 includes an optical member such as a focus lens constituting an imaging optical system. A shutter 12 is a mechanical shutter having an aperture function. An imaging element 14 photoelectrically converts an optical image formed by the imaging optical system including the imaging lens 10 and the shutter 12, and outputs an electric signal. An analog/digital (A/D) converter 16 converts an analog signal output from the imaging element 14 into a digital signal.

A timing generation circuit 18 is a circuit that supplies a clock signal or a control signal to the imaging element 14 and the A/D converter 16, and is controlled by a memory control circuit 22 and a system control circuit 50. For example, by controlling a reset timing of the imaging element 14 using the timing generation circuit 18, accumulation time control using an electronic shutter can be performed, and this can be used for capturing a moving image or the like.

The image processing circuit 20 performs a predetermined pixel interpolation process or color conversion process, auto white balance (AWB) processing, and the like on data from the A/D converter 16 or data from the memory control circuit 22. Further, the image processing circuit 20 realizes an electronic zoom function by performing a process of cutting out and scaling an image. The image processing circuit 20 performs predetermined calculation processes using captured imaged image data. On the basis of calculation results, the system control circuit 50 performs an automatic exposure (AE) process, auto focus (AF) processing, and a flash dimming (EF) process for an exposure control circuit 40, a focus control circuit 42, and a flash 48.

The memory control circuit 22 controls the A/D converter 16, the timing generation circuit 18, the image processing circuit 20, a memory 30, and a compression and decompression circuit 32. Output data of the A/D converter 16 is written to the memory 30 via the image processing circuit 20 and the memory control circuit 22 or directly via the memory control circuit 22.

An image display device 28 includes a liquid crystal display (LCD) or an organic EL display. The image data for display written in the memory 30 is displayed on a screen of the image display device 28 via the memory control circuit 22. The captured image data is sequentially displayed by the image display device 28, and an electronic viewfinder function is realized. Further, in the image display device 28, display ON/OFF control can be arbitrarily performed according to a command of the system control circuit 50, and the amount of power consumption can be greatly reduced through the display OFF control.

Data of a captured still image or moving image is stored in the memory 30. The memory 30 has a storage capacity sufficient for storage of a predetermined number of still images and a predetermined period of time of moving images, and even in the case of continuous capturing (continuous capturing) of still images or panoramic imaging, writing of a large amount of image data at high speed can be performed. The memory 30 can also be used as a work area of the system control circuit 50. The compression and decompression circuit 32 performs a compression process or a decompression process on image data using adaptive discrete cosine transformation (ADCT) or the like. Data obtained through the compression process or the decompression process is stored in the memory 30.

The exposure control circuit 40 has a flash dimming function via controlling the shutter 12 having an aperture function and coordination with the flash 48. The focus control circuit 42 performs control of focus detection and focus adjustment of the imaging lens 10 and a distance measurement process. A zoom control circuit 44 performs zoom control of the imaging lens 10. Each of the control circuits 40, 42, and 44 performs its control according to a command of the system control circuit 50. Exposure control and AF control are performed on the basis of calculation results calculated by the image processing circuit 20 from the captured image data using a through-the-lens (TTL) scheme. The flash 48 includes a flash emission device and has a function of projecting auxiliary light for AF. A light emission operation is performed according to a command from the system control circuit 50.

The system control circuit 50 is a central unit that controls the entire imaging device, and includes a central processing unit (CPU). The CPU reads a program from the memory and executes the program to perform various processes. A mode dial switch 60, shutter switches 62 and 64, a display changeover switch 66, and a zoom switch 72 are illustrated as operation members that are used by a user. An operation unit 70 includes other switches or dials, a touch panel, a pointing device based on line of sight detection, a speech recognition device, and like.

The mode dial switch 60 is used at the time of setting of switching between respective function modes. The shutter switch 62 is turned on during an operation of the shutter release button, and a first switch signal SW1 is generated. Start of an AF process, an AE process, an AWB process, and the like is indicated to the system control circuit 50 by SW1. Further, if the shutter switch 64 is turned on upon completion of the operation of the shutter release button, a second switch signal SW2 is generated. Start of an imaging operation is indicated to the system control circuit 50 by SW2. For example, in the case of flash imaging, after an EF process, the imaging element 14 is exposed over an exposure time determined through the AE process. Flash emission is performed during an exposure period, and a light shielding operation is performed by the exposure control circuit 40 at the same time as the end of the exposure period. A series of processes from the completion of the exposure of the imaging element 14 to a recording process of writing a signal read from the imaging element 14 to a recording medium 200 are executed. More specifically, a process of writing image data to the memory 30 via the A/D converter 16 and the memory control circuit 22, and a developing process in the image processing circuit 20 or the memory control circuit 22 are performed. A process of reading the image data after the development process from the memory 30 and compressing the image data using the compression and decompression circuit 32, a process of recording the image data on the recording medium 200, and the like are performed.

The display changeover switch 66 is a switch that is used for switching of a display of the image display device 28, and power can be saved by cutting off a supply of a current to the image display device 28. The zoom switch 72 is a switch that is used when the user instructs changing a magnification of a captured image, and includes a tele (TELE) switch that changes an imaging angle of view to the telescopic side and a wide (WIDE) switch that changes the imaging angle of view to the wide angle side. According to an operation of the zoom switch 72, the system control circuit 50 gives a command to the zoom control circuit 44 so that the imaging angle of view of the imaging lens 10 is changed, thereby performing optical zoom control. Further, an operation signal of the zoom switch 72 also serves as a trigger signal for changing electronic zooming of the imaging angle of view through cutting-out of an image in the image processing circuit 20, a pixel interpolation process, or the like.

A subject detection circuit 74 detects a subject using a known method such as pattern matching and feature point extraction in cooperation with the image processing circuit 20. As an example of the subject, a face area of a person is detected. Although the subject detection circuit 74 outputs coordinates (area information) of the face area, coordinates of eyes, and the like, the subject detection circuit 74 may detect other subject areas.

A power supply circuit 86 is a primary battery, a secondary battery, an AC adapter, or the like, and supplies power necessary for an operation of the imaging device. An interface (I/F) 90 performs signal transmission between the imaging device and the recording medium 200 such as a memory card or a hard disk. A connector 92 is a connector of a camera body unit that is connected to the recording medium 200. The recording medium 200 includes a recording circuit 204 including a semiconductor memory, a magnetic disk, or the like, an interface (I/F) 205, and a connector 206. The recording medium 200 and the camera body unit are electrically connected by the connectors 206 and 92.

An optical viewfinder 104 is a viewing type of eyepiece finder which is provided so that the user can confirm a composition or the like through the imaging lens 10. The user can perform imaging using only the optical viewfinder 104 without using an electronic view finder function of the image display device 28. A communication device 110 transmits and receives data to and from an external device in a predetermined communication form (USB, IEEE 1394, LAN, wireless communication, or the like). A connector (or an antenna in the case of wireless communication) 112 performs a communication connection with the external device through the communication device 110. The respective constituent units in the image processing device 100 may be configured by hardware, or some of all thereof may be configured as software modules.

Figure 2:
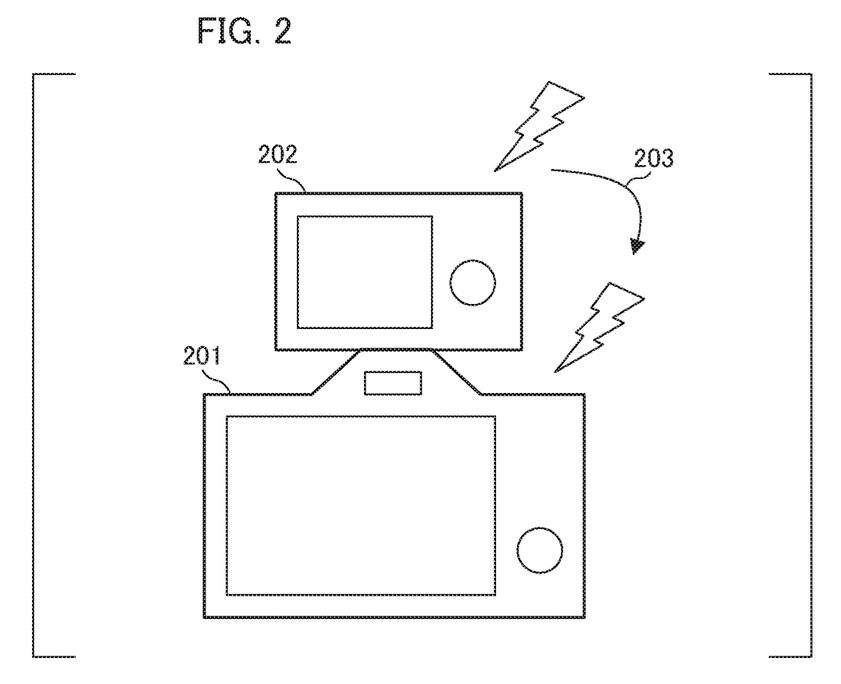
FIG. 2 is a diagram illustrating a method of using a plurality of imaging devices in the first embodiment.

A method of using an imaging system including a plurality of imaging devices will be described with reference to FIG. 2. As an example in which two cameras are used, a connection aspect in which a main device 201 and a sub device 202 mounted on the main device 201 are included is illustrated. A configuration of the main device 201 and the sub device 202 is as illustrated in FIG. 1, and it is assumed that the user mainly operates the main device 201 and wireless communication 203 is performed between the main device 201 and the sub device 202. An example of a communication method for performing transmission and reception of image information or file header information to be recorded includes a method using a wireless LAN (inter-device communication of the IEEE 802.11 standard).

For example, the main device 201 has a zoom function, and is able to perform high-quality imaging such as high-resolution and low-noise imaging. A single lens reflex camera, a mirrorless camera, or the like is mainly used. The sub device 202 is a camera that includes a single focus and wide-angle imaging optical system, has no infrared cut filter, and performs exposure for a long time at a low reading rate. This camera is, for example, a compact camera for composition confirmation, and is used to detect a subject that is not shown in the main device 201 and remove a subject other than a main subject that the user originally wanted to image. Alternatively, a toy camera, a camera mounted on a smartphone, or the like may be used.

Information that can be acquired through communication between the main device 201 and the sub device 202 differs according to a combination thereof or whether image capturing is still image capturing or moving image capturing (or live view capturing). In the case of still image capturing, there is a general standard in a file header in which imaging information is recorded, and the recorded information can be acquired on the basis of the standard. Further, there is information that is made public and can be viewed by anyone, such as the focal length or the image size in the standard, and information with limited usage that is independently recorded for each manufacturer. As the latter information, additional imaging conditions, information detected by the camera, and the like can be recorded. Further, in the case of moving image capturing, there is no standard regarding a file header in which information equivalent to a still image is recorded, and therefore, the content of information that can be acquired or an acquisition method is limited unless a mechanism capable of transmitting and receiving information is mounted in advance.

For the display of the captured image, there is a method of superimposing the image captured by the main device 201 and the image captured by the sub device 202 for a composition confirmation usage. Further, if the usage of the sub device 202 is detection of surrounding subjects or the like that are not shown in the main device 201, only the image captured by the main device 201 is used as the display image and the data of the images captured by the sub device 202 is used only for internal processing.

Although an example in which only the display device, the operation member, and the like of the main device 201 are used has been described in order to simplify the description, the display device, the operation member, and the like of the sub device 202 may be used more easily. Alternatively, use can be improved by utilizing features of the respective display devices or the respective operation members of the main device 201 and the sub device 202 together. The communication between the main device 201 and the sub device 202 is not limited to wireless communication and may be performed through wired communication via a connector such as an accessory shoe. Further, embodiments in which two cameras having equivalent performance are combined or embodiments in which three or more cameras are combined may be adopted.

Figure 3A:
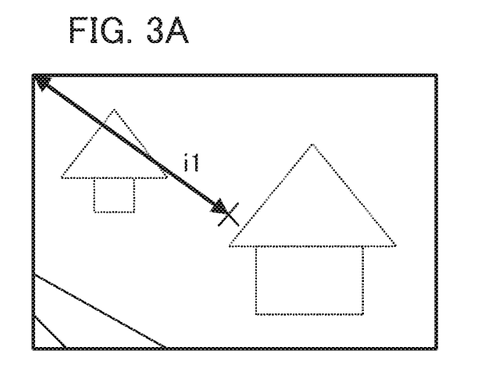
FIGS. 3A to 3E are diagrams illustrating handling of captured images according to the first embodiment.
Figure 3B:
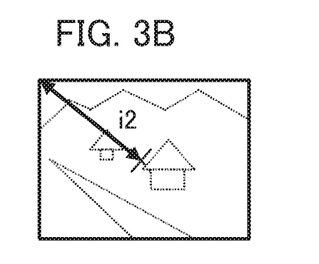

Handling of a captured image in the first embodiment will be described with reference to FIGS. 3A to 3E. The main device 201 is a telescopic device and includes a large number of pixels and the sub device 202 is a wide angle device and includes a small number of pixels. FIG. 3A illustrates an example of a captured image of the main device 201, and FIG. 3B illustrates an example of a captured image of the sub device 202. Regarding a size of a screen, a image size in FIG. 3A is illustrated to have a length i1 corresponding to one-half of a diagonal line, an image size in FIG. 3B is illustrated to have a length i2 corresponding to one-half of the diagonal line, and "i1>i2". Further, since the main device 201 is a device which is more telescopic than the sub device 202, the image size of the subject is relatively greater than that of the sub device 202. That is, a difference between the image size of the subject captured by the main device 201 and the image size of the subject captured by the sub device 202 is great.

Figure 3C:
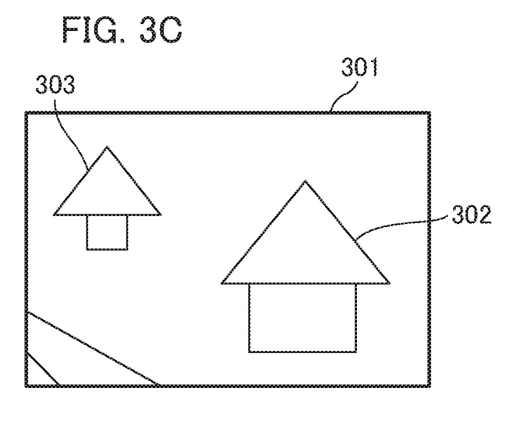
Figure 3D:
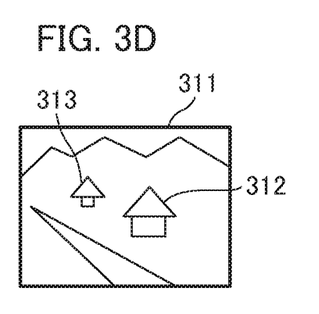
Figure 3E:
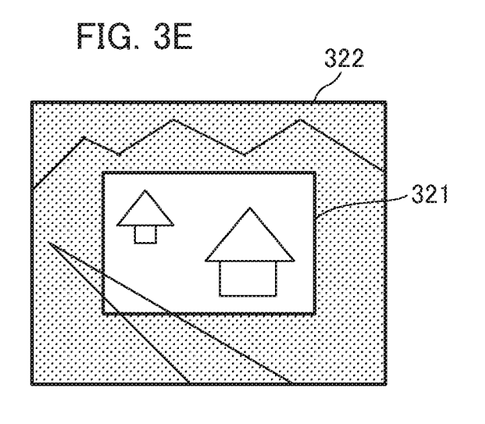

A captured image 301 of the main device 201 illustrated in FIG. 3C includes an image of a house 302 which is a first subject close to the main device 201, and an image of a house 303 which is a second object far from the main device 201. In a captured image 311 of the sub device 202 illustrated in FIG. 3D, a house 312 close to the sub device 202 and a house 313 far from the sub device 202 are shown. The house 312 corresponds to the first object (the house 302), and the house 313 corresponds to the second object (the house 303). The alignment of the two images is performed using edges of the subject with an outline. FIG. 3E is a schematic diagram illustrating an image when two images after the alignment are superimposed. A state in which an image 321 of the main device 201 is affixed to an image 322 of the sub device 202 after the images are resized is shown.

Here, a calculation of resizing for matching sizes of subject images, which is performed by the system control circuit 50, will be described. The focal length of the main device 201 is denoted as f1, the focal length of the sub device 202 is denoted as f2, the number of diagonal pixels of the main device 201 is denoted as i1, and the number of diagonal pixels of the sub device 202 is denoted as i2. If a resizing ratio is indicated as X, the resizing ratio is calculated using Equation (1) below.

$$X = (f1/f2) \times (i1/i2) \quad (1)$$

The captured image of the main device 201 is reduced in size if the value of X is greater than 1, and the captured image of the sub device 202 is reduced in size if the value of X is smaller than 1, such that the images of the subject are changed to the same size and the alignment is performed. If aspect ratios of the two images are different, it is necessary to calculate the ratio according to an image size in a diagonal direction. If the aspect ratios of the two images are the same, the ratio can be calculated according to the image size in a horizontal direction or a vertical direction. In the resizing process, the ratio for changing the images of the subject in a plurality of images to the same size is calculated and the size change is performed.

Figure 4:
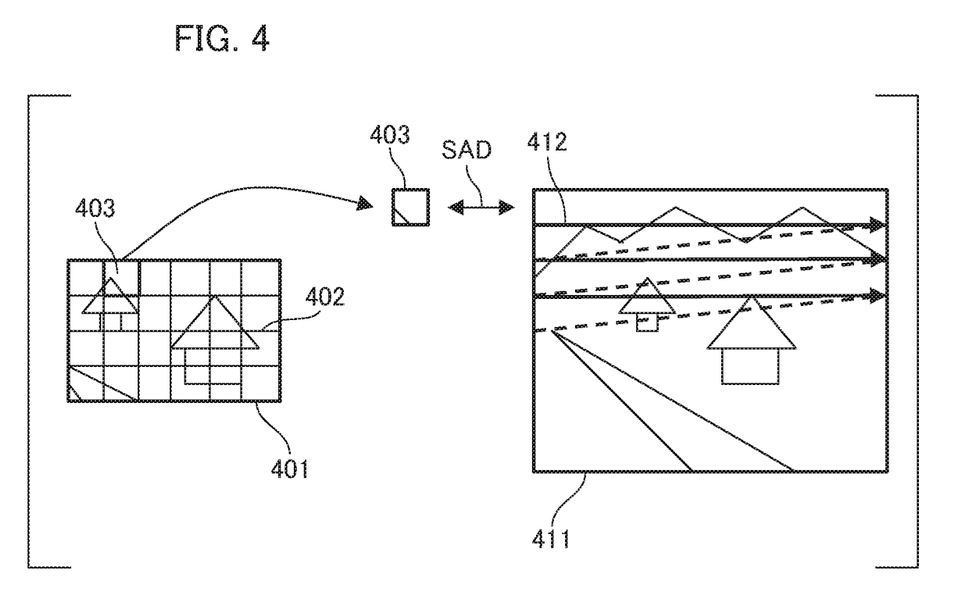
FIG. 4 is an illustrative diagram illustrating an alignment process of the first embodiment.

A alignment process that is performed by the image processing circuit 20 and the system control circuit 50 will be described with reference to FIG. 4. FIG. 4 is a schematic diagram illustrating a main image 401 on the left side and a sub image 411 on the right side. The alignment is performed using blocks in which an edge of a subject image is detected among a plurality of blocks (rectangular regions) constituting the image. A process of ascertaining a size of the subject image on the basis of a focal length of the imaging optical system and the number of recording pixels is performed, and the main image 401 resized according to a size relationship is divided into a plurality of blocks 402. The system control circuit 50 determines whether or not an edge of the subject image is present within each block. A block 403 is one of the blocks in which edges are detected. Using these blocks 403, a process of sequentially calculating a sum of absolute differences (SAD) is performed for the sub image 411. It can be determined that the subjects match at a position at which the sum of absolute differences is the smallest. The system control circuit 50 executes the calculation of the sum of absolute differences for all the blocks in which the edge of the subject image is detected (see an arrow 412) and specifies an exact coordinate position while excluding an erroneous determination result by majority logic or the like.

Examples of the alignment method include a method of affixing an image according to a coordinate position output for each block, and a method of calculating a representative motion vector of a center of an image, the periphery of the image, or the like from a coordinate position output for each block, and performing geometric deformation such as affine transformation. The resizing to be performed before the alignment is performed with coarse precision based on the focal length and the number of recording pixels, and more detailed resizing is performed with high precision at the time of execution of a subsequent alignment process.

Figure 5:
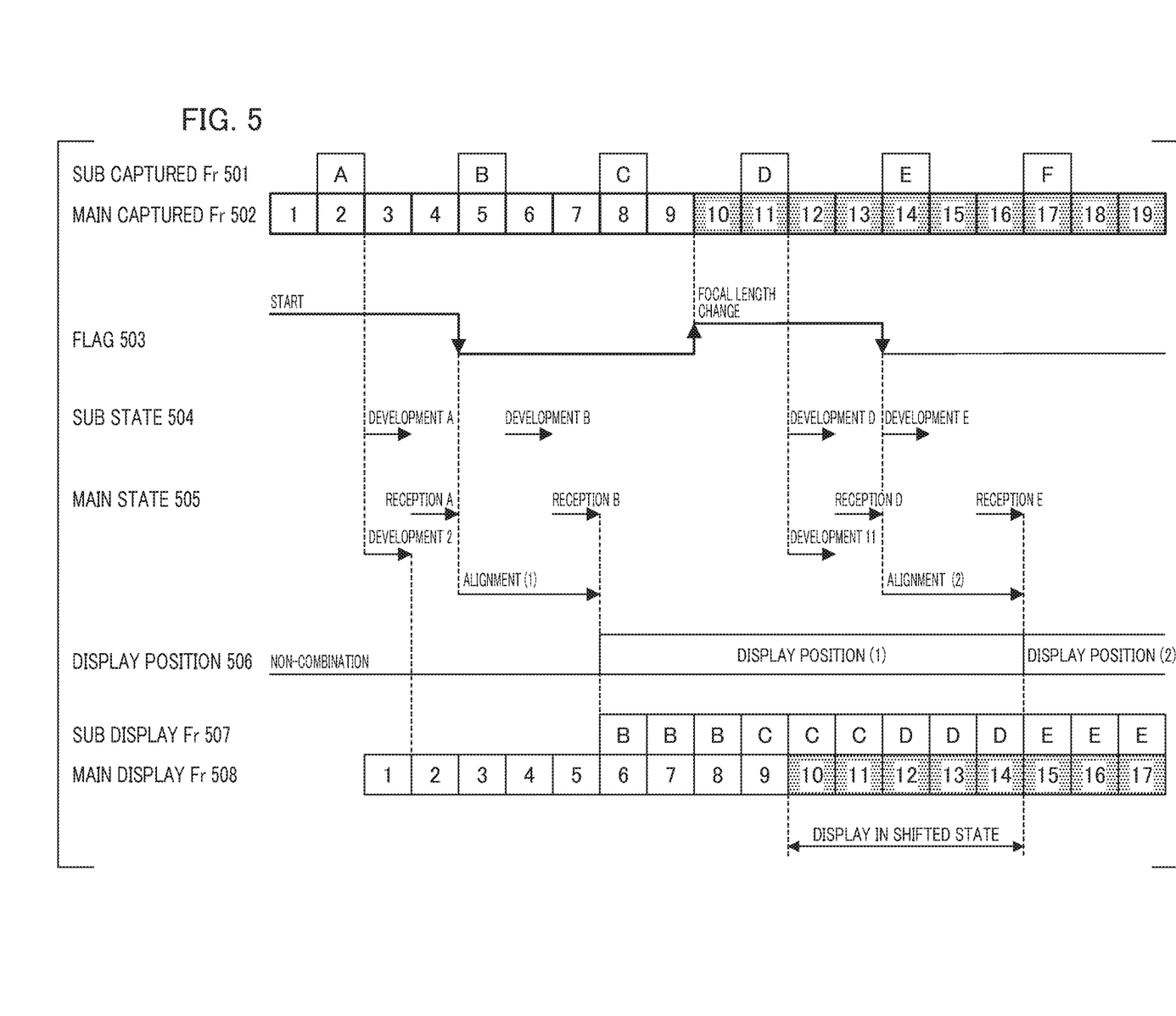
FIG. 5 is an illustrative diagram illustrating an operation sequence of the first embodiment.

An operation sequence of the first embodiment will be described with reference to FIG. 5. In the first embodiment, an example in which the main device 201 periodically receives image data from the sub device 202 and superimposes and displays captured images of respective devices on a display screen of the main device 201 as a live image will be described. FIG. 5 illustrates captured frames 501 and 502 of the respective devices, a flag 503, operation states 504 and 505 of the respective devices, a display position 506 of the image, and display frames 507 and 508 of the respective devices. A direction of a time axis is from left to right in FIG. 5.

For example, it is assumed that the main device 201 acquires image data at 30 fps (frames per seconds) and the sub device 202 acquires image data at 10 fps. Further, it is assumed that a time required for alignment is not within 33 ms (milliseconds) which is one frame period of the main device 201, and is a time corresponding to 3 frames. In FIG. 5, the captured frame 501 of the sub device 202 is distinguished by alphabets A to F, the captured frame 502 of the main device 201 is distinguished by Arabic numerals 1 to 19, and a frame number of the main device 201 is used as a reference for description. The flag 503 is a flag indicating whether or not performance of alignment is required, and indicates a timing of imaging start, focal length change, or the like. In the state 504 of the sub device 202, processes of developments A to E are shown and correspond to frames A to E of the captured frame 501, respectively. In the state 505 of the main device 201, processes of receptions A to E are shown and correspond to frames A to E of the captured frame 501 respectively. The development 2 and the development 11 correspond to frames 2 and 11 of the captured frame 502. Further, alignment (1) indicates a period of a first alignment process, and alignment (2) indicates a period of the next alignment process. In the display position 506, non-combination, display position (1), and display position (2) are shown. The display frame 507 of the sub device 202 is distinguished by alphabets B to E, and the display frame 508 of the main device 201 is distinguished by Arabic numerals 1 to 17.

First, an operation from a power-on time will be described. In a temporal relationship between the captured frame 501 of the sub device 202 and the captured frame 502 of the main device 201, the sub device 202 acquires image data of the first frame A at a timing when the main device 201 is acquiring image data of the frame 2. Since the alignment is not performed at a point in time of power-on, the flag 503 is set (a flag value is indicated as F). If both the sub device 202 and the main device 201 acquire image data, the respective devices perform processes of development A and development 2, respectively. After completion of the developing process, the sub device 202 performs transmission of an image to the main device 201. Reception A indicates a timing. When the main device 201 receives image data of frame A. After the reception A, the value of the flag 503 changes from F to a predetermined value (indicated as T), and here, alignment (including resizing) can be executed for the first time. During the alignment (1), a process of aligning the images with each other is performed. If the process of the alignment (1) ends, the respective images of the frame 6 and the frame B, which are the latest frames at that point in time, are superimposed and displayed at the display position (1). Further, before that, it is assumed that the images (display frames 1 to 5) obtained by the main device 201 are independently displayed, and after the display position (1) is determined, the respective images obtained by the main device 201 and the sub device 202 can be superimposed and displayed at a desired position for the first time.

Next, an operation at the time of changing of the focal length will be described. A point in time when the focal length change of the main device 201 is completed is a timing of completion of a frame 9 of the main device 201, and the value of the flag 503 changes from T to F. A combination of images that can be aligned immediately after that is an image of a frame 11 of the main device 201 and an image of a frame 1) of the sub device 202. Development D of the sub device 202 and development 11 of the main device 201 are performed and, after the development is completed, the sub device 202 performs transmission of the image to the main device 201. The main device 201 receives the image data in reception D, the value of the flag 503 changes from F to T at a timing when the reception D is completed. In this case, the alignment (including resizing) can be executed. During a period of alignment (2), a process of aligning the images with each other is performed. If the alignment process is completed, respective images of the frame E and the frame 15, which are the latest frames at that time in time, are superimposed and displayed at the display position (2).

At a point in time when the focal length has changed, the image of the main device 201 is an image of a frame 10, and a point in time of change to the display position (2) is a timing when the frame 15 is displayed. The images are shifted and displayed in five frames (sub display frames C, C, D, D, D and main display frames 10 through 14) during the period. In the first embodiment, the following process is performed in order to shorten a total time of the period during which the image is shifted and displayed.

Figure 6:
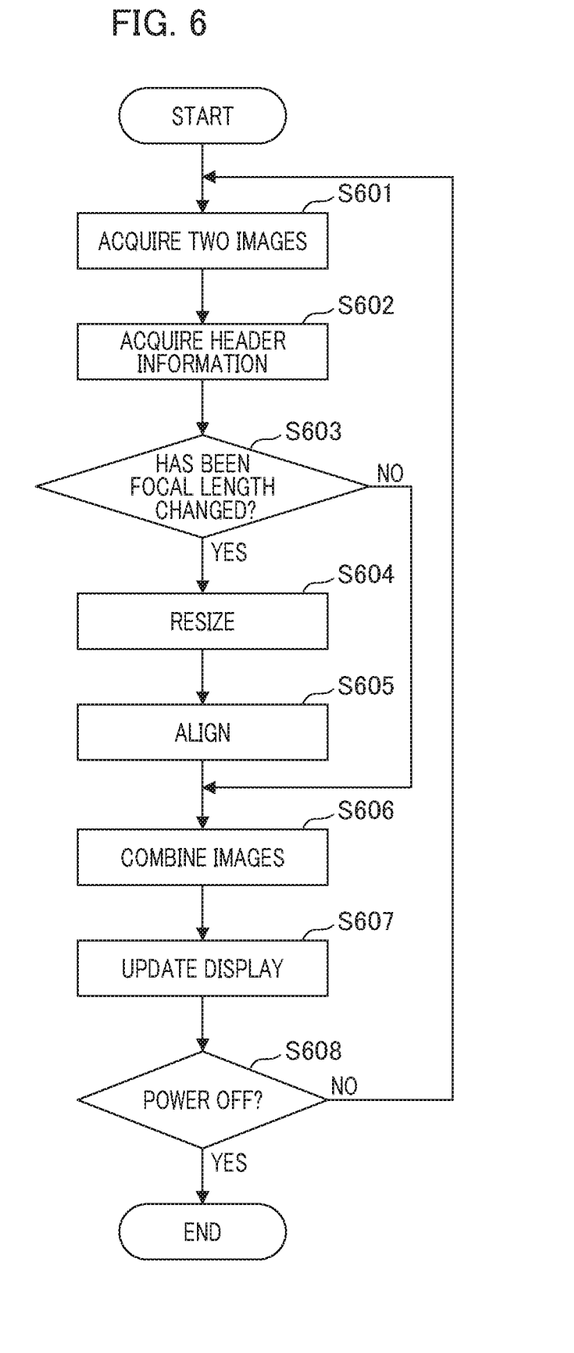
FIG. 6 is a flowchart illustrating a process of the first embodiment.

Image processing in the first embodiment will be described with reference to a flowchart of FIG. 6. The following process is executed mainly by the CPU of the main device 201. First, a process of acquiring data of two images from the main device 201 and the sub device 202 is performed (S601). Next, the focal length and the number of recording pixels are acquired as header information (S602). A process of determining whether or not the focal length of the main device 201 has been changed is executed (S603). Here, if it is determined that the focal length has been changed, the process proceeds to S604, and if it is determined that the focal length has not been changed, the process proceeds to S606.

In step S604, a resizing process is performed so that the images of the subjects have the same size in the respective images, and then a alignment process is performed (S605). The display position is updated according to a result of the alignment process, and an image combination process is performed (S606). A process of displaying the image that is an image combination result is performed, and a display image is updated (S607).

If the process proceeds from S603 to S606, the image combination process is performed without updating the display position, and the image that is the image combination result is displayed (S607). If a power OFF operation is detected in S608, a series of processes ends, and if the power OFF operation is not detected, the process returns to S601 and the process is continued.

As described above, it becomes possible to recognize the size relationship of the subject shown in the two images, which are alignment targets, in advance by acquiring the focal length and the number of recording pixels which are the file header information of the recorded image. That is, it is necessary to repeat the resizing and the alignment each time when the size relationship has not been recognized in advance, whereas in the first embodiment, it is possible to reduce the number of repetitions of the alignment. Further, according to the first embodiment, it is possible to detect that the focal length has been changed and to perform the resizing and the alignment again in a timely manner.

Second Embodiment

Figure 7:
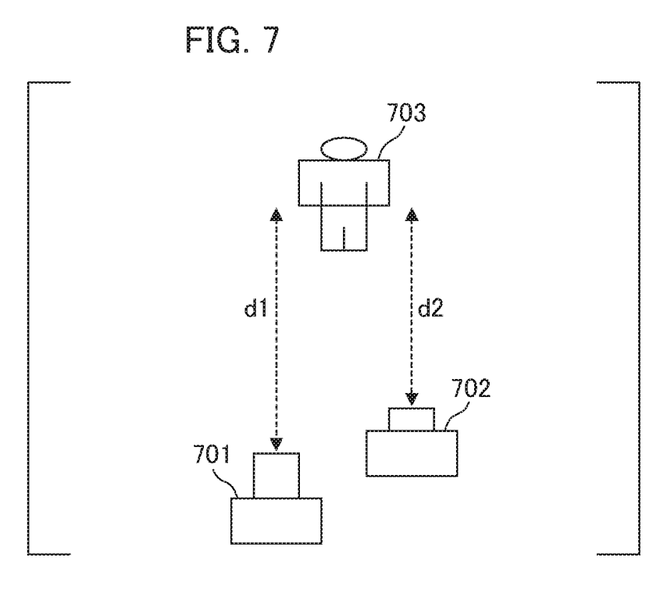
FIG. 7 is a diagram illustrating a second embodiment.

A second embodiment of the present invention will be described with reference to FIG. 7. In the second embodiment, description of the same matters as those of the first embodiment will be omitted, and differences between the embodiments will be mainly described. The omission of such description is the same in embodiments to be described below. FIG. 7 is a schematic diagram illustrating an example in which a main subject 703 is imaged by the main device 701 and the sub device 702. A distance (subject distance) between the main device 701 and the main subject 703 is indicated by d1, and a distance between the sub device 702 and the main subject 703 is indicated by d2. A focal length of the main device 701 is indicated by f1, a focal length of the sub device 702 is indicated by f2, the number of diagonal pixels of the main device 701 is indicated by i1, and the number of diagonal pixels of the sub device 702 is indicated by i2.

In the resizing process to be executed to match the sizes of the images of the main subject 703, which is an imaging target, a resizing ratio (indicated by Y) is calculated from Equation (2) below using the focal lengths f1 and 12 of the respective devices, the number of diagonal pixels i1 and i2, and the subject distances d1 and d2.

$$Y=(f1/f2)\times(i1/i2)/(d1/d2) \quad (2)$$

If the value of Y is greater than 1, the image captured by the main device 701 is reduced, and if the value of Y is smaller than 1, the image captured by the sub device 702 is reduced so that the images of the subject are changed to the same size. The alignment is then performed.

Differences between the second embodiment and the first embodiment will be described with reference to FIG. 6. In step S602, the system control circuit 50 acquires information on the focal length, the number of diagonal pixels, and the subject distance. In step S603, the system control circuit 50 determines whether the focal length or the subject distance, or the focal length and the subject distance have changed. If it is determined that the focal length or the subject distance has changed or the focal length and the subject distance have changed, the process proceeds to S604, in which the image processing circuit 20 calculates the resizing ratio Y and performs the resizing process. In S605, the image processing circuit 20 performs the alignment process.

In the second embodiment, it is possible to recognize the size of the subject even if the imaging position of the main device is different from the imaging position of the sub device by acquiring the distance information from each device to the subject in addition to the focal length and the number of recording pixels of each device. Further, even if the imaging position of the main device is the same as the imaging position of the sub device, a parallax may occur particularly if there is the subject at a short distance from the camera. Therefore, in the second embodiment, it is possible to detect a timing when the subject distance has changed by monitoring the subject distance information and perform the alignment again. The resizing process to be performed before the alignment may be performed on the basis of the focal length and the number of recording pixels of each device, and the subject distance may be used to determine the validity thereof.

Third Embodiment

Figure 8A:
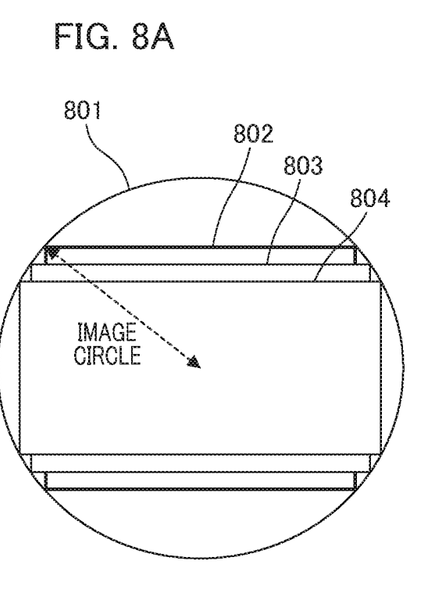
FIGS. 8A and 8B are diagrams illustrating a third embodiment.

A third embodiment of the present invention will be described with reference to FIGS. 8A and 8B. FIG. 8A is a schematic diagram illustrating a state in which image circles are aligned in a plurality of images having different aspect ratios. Three types of images 802 to 804 are illustrated within a frame indicating an image circle 801. An aspect ratio "N:M" indicates a ratio which is N in a horizontal direction and M in a vertical direction. The image 802 is an image captured at a first angle of view, in which the aspect ratio is "4:3". The image 803 is an image captured at a second angle of view, in which the aspect ratio is "3:2". The image 804 is an image captured at a third angle of view, in which the aspect ratio is "16:9". If separately acquired focal lengths are the same, the numbers of diagonal pixels are the same even if the aspect ratios are different, and therefore, subject sizes are the same.

Figure 8B:
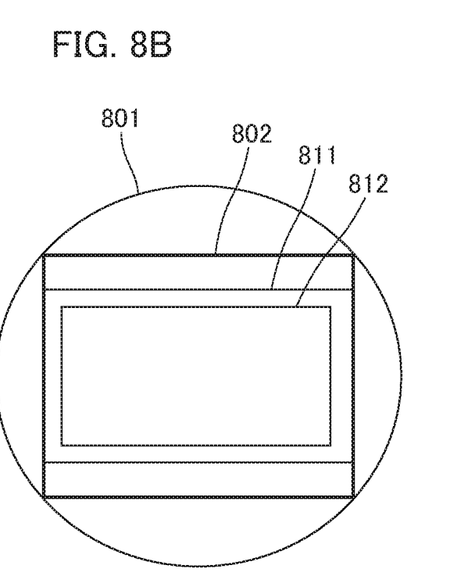

FIG. 8B illustrates three images with different image circles. An image 802 is an image having an aspect ratio of "4:3" of which a diagonal portion conforms to an image circle 801, and has an angle of view which is a reference at the time of imaging of still images. If the number of horizontal pixels of the imaging element is not sufficient, for example, an image captured at the angle of view of "16:9" of which a diagonal portion conforms to the image circle may not be obtained. In this case, an image having the angle of view of "16:9" is obtained by removing a predetermined range in a vertical direction of the image having the angle of view of "4:3", as shown in an image 811. Further, in an imaging device or the like having an electronic image blurring correction function, a vibration isolation (image blurring correction) process is performed by including a pixel group around an area in which image data is recorded and changing a cutout range of the image. If the number of surrounding pixels of the imaging element is insufficient, a process of cutting out an image around a recording area is performed, as shown in an image 812. If the diagonal portions are not aligned with the image circle 801 as in the images 811 and 812, the angle of view is changed, and therefore, this is equivalent to a substantial change in the focal length. If the focal length recorded in a header of a file is not aligned with the image circle without considering the cutout of the surrounding pixels, the size of the subject cannot be recognized correctly. Therefore, the system control circuit 50 performs a process of associating information indicating a difference in angle of view as additional information with the image data after imaging. On the basis of this additional information, it is possible to accurately recognize a relationship between the subject sizes in the images of the respective devices from the relationship between the image circle 801 and the angle of view (diagonal) after a cutting process.

In the third embodiment, more accurate resizing can be performed by recognizing the relationship between the image circle and the angle of view (diagonal) after the cutting process, in addition to the focal length and the number of recording pixels of each device. Even if images are images with different aspect ratios or images with narrow angle of view due to electronic image blurring correction or the like, a size relationship of the subject sizes can be recognized between the two images.

According to the above embodiments, the subject size can be recognized in advance when alignment of a plurality of images obtained from different imaging units is performed. Therefore, it is possible to reduce the number of repetitions of alignment and shorten a processing time. Further, it is possible to reduce a possibility of alignment being performed between similar subjects having different sizes. Furthermore, it is possible to reduce driving power of the device by detecting a change in imaging conditions to determine the necessity of alignment and performing the alignment at a necessary timing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-188179, filed Sep. 28, 2017 which is hereby incorporated by reference wherein in its entirety.

What is claimed is:

1. An image processing device comprising: at least one memory device; at least one processor; an acquiring unit configured to acquire first image data captured by a first imaging device and second image data captured by a second imaging device different form the first imaging device; and a processing unit configured to perform calculations for a ratio for changing a same subject in the first image data and the second image data to a same size based on a focal length of an imaging optical system used in capturing the first image data, a number of pixels of the first image data, first distance information up to the subject corresponding to the first imaging device, a focal length of an imaging optical system used in capturing the second image data, a number of pixels of the second image data, and second distance information up to the subject corresponding to the second imaging device, configured to perform resizing of at least one of the first image data and the second image data using the ratio, and configured to perform alignment between coordinates of the same subject included in the first image data and coordinates of the subject included in the second image data, wherein the acquiring unit and the processing unit are implemented by the at least one processor executing at least one program recorded on the at least one non-transitory memory device.

2. The image processing device according to claim 1, wherein the processing unit performs the calculations if a size relationship of the subject in the first image data and the second image data is changed.

3. The image processing device according to claim 1, wherein the processing unit performs the resizing and the alignment when the focal length of the first imaging optical system is changed.

4. The image processing device according to claim 1, wherein the processing unit performs the resizing and the alignment when at least one of the first distance information and the second distance information is changed.

5. The image processing device according to claim 1,
   wherein the first image data is image data captured at an angle of view different from that of the second image data, and
   wherein the processing unit performs a process of associating information indicating a difference in the angle of view as additional information with at least one of the first image data and the second image data.

6. The image processing device according to claim 1, wherein the processing unit combines the first image data and the second image data which have been resized and aligned, and output the combined image data to a display device.

7. A first imaging device comprising: a first imaging element; at least one memory device; at least one processor; an acquiring unit configured to acquire second image data captured by a second imaging device different from the first imaging device, a focal length of an imaging optical system used in capturing the second image data, a number of pixels of the second image data, and second distance information up to a subject corresponding to the second imaging device from the second imaging device via a communication device; and a processing unit configured to perform calculations for a ratio for changing a same subject in the first image data and the second image data to a same size based on a focal length of an imaging optical system used in capturing the first image data, a number of pixels of the first image data, first distance information up to the subject corresponding to the first imaging device, the focal length of an imaging optical system used in capturing the second image data, the number of pixels of the second image data, and second distance information up to the subject corresponding to the second imaging device, configured to perform resizing of at least one of the first image data and the second image data using the ratio, and configured to perform alignment between coordinates of the same subject included in the first image data and coordinates of the subject included in the second image data, wherein the acquiring unit and the processing unit are implemented by the at least one processor executing at least one program recorded on the at least one non-transitory memory device.

8. The imaging device according to claim 7, wherein the focal length of the imaging optical system used in capturing the first image data is longer than the focal length of the imaging optical system used in capturing the second image data.

9. The imaging device according to claim 7,
wherein the first image data is image data captured at an angle of view different from that of the second image data, and
wherein the processing unit performs a process of associating information indicating a difference in the angle of view as additional information with at least one of the first image data and the second image data.

10. The image processing device according to claim 7, wherein the processing unit performs the resizing and the alignment when the focal length of the first imaging optical system is changed.

11. An image processing method that is executed by an image processing device, the method comprising: acquiring first image data captured by a first imaging device and second image data captured by a second imaging device different form the first imaging device; performing calculations for a ratio for changing a same subject in the first image data and the second image data to a same size based on a focal length of an imaging optical system used in capturing the first image data, a number of pixels of the first image data, first distance information up to the subject corresponding to the first imaging device, a focal length of an imaging optical system used in capturing the second image data, a number of pixels of the second image data, and second distance information up to the subject corresponding to the second imaging device; performing resizing of at least one of the first image data and the second image data using the ratio; and performing alignment between coordinates of the same subject included in the first image data and coordinates of the subject included in the second image data.

* * * * *